(12) United States Patent
Be'ery et al.

(10) Patent No.: US 11,050,786 B2
(45) Date of Patent: *Jun. 29, 2021

(54) COORDINATED DETECTION AND DIFFERENTIATION OF DENIAL OF SERVICE ATTACKS

(71) Applicant: Imperva, Inc., Redwood City, CA (US)

(72) Inventors: Tal Arieh Be'ery, Petach Tikva (IL); Amichai Shulman, Tel Aviv (IL)

(73) Assignee: Imperva, Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/520,215

(22) Filed: Jul. 23, 2019

(65) Prior Publication Data
US 2019/0349395 A1 Nov. 14, 2019

Related U.S. Application Data

(63) Continuation of application No. 15/286,487, filed on Oct. 5, 2016, now Pat. No. 10,404,742, which is a continuation of application No. 14/832,893, filed on Aug. 21, 2015, now Pat. No. 9,485,264, which is a continuation of application No. 14/088,788, filed on Nov. 25, 2013, now Pat. No. 9,148,440.

(51) Int. Cl.
*H04L 29/06* (2006.01)
*H04L 12/24* (2006.01)

(52) U.S. Cl.
CPC ...... *H04L 63/1458* (2013.01); *H04L 41/0686* (2013.01); *H04L 63/1416* (2013.01)

(58) Field of Classification Search
CPC .............. H04L 63/1416; H04L 63/1458

USPC .......................................................... 726/23
See application file for complete search history.

(56) References Cited

U.S. PATENT DOCUMENTS

| 7,600,255 | B1 | 10/2009 | Baugher |
| 8,302,180 | B1 | 10/2012 | Gudov et al. |
| 8,397,284 | B2 | 3/2013 | Kommareddy et al. |
| 2004/0015721 | A1 | 1/2004 | Eastlake et al. |
| 2006/0010389 | A1* | 1/2006 | Rooney ............... H04L 63/1425 715/736 |

(Continued)

OTHER PUBLICATIONS

Advisory Action from U.S. Appl. No. 15/286,487, dated Mar. 14, 2018, 7 pages.

(Continued)

*Primary Examiner* — Mohammad W Reza
(74) *Attorney, Agent, or Firm* — Nicholson De Vos Webster & Elliott LLP (57) ABSTRACT

An analyzer module (AM) within a same protected network and on-premise with a server detects and distinguishes between types of Denial-of-Service (DoS) attacks. The AM tracks whether test messages, which include test request messages that a signal generation module (SGM) is configured to transmit to the server according to a predefined time schedule to allow the AM to detect and distinguish between types of DoS attacks, are timely received. The AM is aware of the predefined time schedule according to which the SGM is configured to transmit the test request messages to the server. The AM detects an occurrence of a DoS attack and identifies the type of the DoS attack based upon the result of the tracking indicating that a number of the test messages have not been timely received.

20 Claims, 6 Drawing Sheets

(56) References Cited

U.S. PATENT DOCUMENTS

| | | | |
|---|---|---|---|
| 2007/0033650 A1 | 2/2007 | Grosse et al. | |
| 2007/0130619 A1 | 6/2007 | Reams, III | |
| 2011/0035801 A1 | 2/2011 | Li | |
| 2011/0099622 A1 | 4/2011 | Lee et al. | |
| 2011/0107412 A1 | 5/2011 | Lee et al. | |
| 2011/0320617 A1 | 12/2011 | Annamalaisami et al. | |
| 2012/0174220 A1 | 7/2012 | Rodriguez | |
| 2013/0254879 A1 | 9/2013 | Chesla et al. | |
| 2014/0304798 A1* | 10/2014 | Iyengar | H04L 63/1458 726/11 |
| 2014/0365775 A1 | 12/2014 | Yavuz et al. | |
| 2015/0007314 A1* | 1/2015 | Vaughan | H04L 63/1425 726/23 |
| 2015/0229669 A1* | 8/2015 | Xin | H04L 67/10 726/23 |

OTHER PUBLICATIONS

Final Office Action from U.S. Appl. No. 15/286,487, dated Jan. 10, 2019, 14 pages.
Final Office Action from U.S. Appl. No. 15/286,487, dated Dec. 29, 2017, 14 pages.
Non-Final Office Action from U.S. Appl. No. 15/286,487, dated Jun. 14, 2018, 11 pages.
Non-Final Office Action from U.S. Appl. No. 15/286,487, dated Jun. 23, 2017, 16 pages.
Notice of Allowance from U.S. Appl. No. 15/286,487, dated Apr. 24, 2019, 8 pages.
Notice of Allowance from U.S. Appl. No. 14/832,893 dated Jul. 5, 2016, 14 pages.

* cited by examiner

TRACKING WHETHER TEST HTTP MESSAGES ARE TIMELY RECEIVED, WHEREIN THE TEST HTTP MESSAGES COMPRISE TEST HTTP REQUEST MESSAGES THAT A SIGNAL GENERATION MODULE IS CONFIGURED TO TRANSMIT TO A WEB APPLICATION SERVER ACCORDING TO A SCHEDULE AND TEST HTTP RESPONSE MESSAGES THAT THE WEB APPLICATION SERVER IS EXPECTED TO TRANSMIT TO THE SIGNAL GENERATION MODULE IN RESPONSE TO THE TEST HTTP REQUEST MESSAGES, WHEREIN THE TEST HTTP REQUEST MESSAGES AND THE TEST HTTP RESPONSE MESSAGES ARE FOR THE PURPOSE OF ALLOWING THE ANALYZER MODULE TO DETECT AND DISTINGUISH BETWEEN THE PLURALITY OF TYPES OF DOS ATTACKS, WHEREIN THE SIGNAL GENERATION MODULE IS EXECUTING ON A DEVICE THAT IS OFF-PREMISE AND OUTSIDE A PROTECTED NETWORK, WHEREIN THE ANALYZER MODULE IS AWARE OF A TIMELINESS WITH WHICH THE SIGNAL GENERATION MODULE IS EXPECTED TO TRANSMIT THE TEST HTTP REQUEST MESSAGES TO THE WEB APPLICATION SERVER AND WITH WHICH THE WEB APPLICATION SERVER IS EXPECTED TO TRANSMIT THE TEST RESPONSE HTTP MESSAGES TO THE SIGNAL GENERATION MODULE IN RESPONSE TO THE TEST REQUEST HTTP MESSAGES 605

WHEREIN THE TEST HTTP REQUEST MESSAGES INCLUDE ONE OR MORE OF:

A FIRST PLURALITY OF MESSAGES TO BE TRANSMITTED USING A CONFIGURED INTERNET PROTOCOL (IP) ADDRESS OF THE WEB APPLICATION SERVER 610

A SECOND PLURALITY OF MESSAGES ONLY TO BE TRANSMITTED AFTER A SUCCESSFUL RESOLUTION, FOR EACH MESSAGE, OF AN IP ADDRESS OF THE WEB APPLICATION SERVER VIA A DNS QUERY 615

A THIRD PLURALITY OF MESSAGES TO BE TRANSMITTED USING THE MOST RECENT SUCCESSFULLY RESOLVED IP ADDRESS ATTAINED BY THE DNS QUERIES 620

DETECTING THE OCCURRENCE OF A DOS ATTACK AND IDENTIFYING THE TYPE OF THE DOS ATTACK BASED UPON THE RESULT OF THE TRACKING INDICATING THAT A NUMBER OF THE TEST HTTP MESSAGES HAVE NOT BEEN TIMELY RECEIVED BY THE ANALYZER MODULE 625

WHEREIN THE TYPE OF THE DOS ATTACK CAN BE DIFFERENTIATED BETWEEN THE FOLLOWING DOS ATTACK TYPES:

APPLICATION LAYER DOS ATTACKS 630

DNS TAKEDOWN ATTACKS 635

DNS REDIRECTION ATTACKS 640

VOLUMETRIC ATTACKS 645

COORDINATED DETECTION AND DIFFERENTIATION OF DENIAL OF SERVICE ATTACKS

CROSS-REFERENCE TO RELATED APPLICATIONS

This application is a continuation of U.S. application Ser. No. 15/286,487, filed Oct. 5, 2016, which issued as U.S. Pat. No. 10,404,742 on Sep. 3, 2019, which is a continuation of U.S. application Ser. No. 14/832,893, filed Aug. 21, 2015, which issued as U.S. Pat. No. 9,485,264 on Nov. 1, 2016, which is a continuation of U.S. application Ser. No. 14/088,788, filed Nov. 25, 2013, which issued as U.S. Pat. No. 9,148,440 on Sep. 29, 2015, which are hereby incorporated by reference.

FIELD

Embodiments of the invention relate to the field of computer networking; and more specifically, to the coordinated detection and differentiation of denial-of-service attacks.

BACKGROUND

In computing, a denial-of-service (DoS) attack or distributed denial-of-service (DDoS) attack is an explicit attempt to make a computing device or a network resource (e.g., an application, a file system) unavailable to its intended users. The perpetrators of DoS attacks typically attempt to temporarily or indefinitely interrupt or suspend services of a computing device connected to the Internet. For example, a DoS attack may attempt to overwhelm a network resource, consume available bandwidth in a network, disrupt or modify configuration information (e.g., routing information) in one or more computing devices involved in a communications path, disrupt maintained state information of computing devices, and/or disrupt physical network components.

One type of DoS attack commonly referred to as a volumetric attack involves overwhelming the target computing device or network resource with such a large volume of network traffic that the target does not receive legitimate traffic, cannot respond to legitimate traffic, or responds so slowly to legitimate traffic that it becomes effectively unavailable. One or more computing devices located outside a network of the target typically originate volumetric attacks by transmitting traffic toward the network or target. Volumetric DoS attacks may directly affect a targeted computing device and/or another computing device (e.g., a network device such as a router or switch) on the same local area network (LAN) as the targeted computing device. Some volumetric DoS attacks create problems outside the LAN of the target device that the target may not even be aware of. For example, the resources of a network device outside of the LAN of the target (but possibly located within a path between the LAN and the Internet) may be consumed by an attack, which will affect the target as well as other computing devices or resources within the LAN. A few types of volumetric attacks include Internet Control Message Protocol (ICMP) floods, User Datagram Protocol (UDP) floods, and Transmission Control Protocol (TCP) state exhaustion attacks such as TCP SYN floods and idle session attacks.

Another type of DoS attack is commonly referred to as an application layer DoS attack, which targets a resource (e.g., a computer application) executing on a computing device. Application layer DoS attacks typically strive to overwhelm network infrastructure and server computing devices by targeting well-known applications such as Hypertext Transfer Protocol (HTTP), VoIP, or Simple Mail Transfer Protocol (SMTP).

One type of application layer DoS attack is known as a Request Flood attack, in which a perpetrator transmits a large number of seemingly legitimate application layer requests (such as HTTP GET or POST request messages, Session Initiation Protocol (SIP) INVITE messages, or Domain Name Server (DNS) queries) to a target server in an attempt to consume or overwhelm its resources. Another type of application layer DoS attack is known as an asymmetric attack, in which a perpetrator transmits a relatively normal rate of requests to a target that cause the target to perform a large amount of work, and possibly consume a large amount of processing time, disk space, memory, or network resources. Some perpetrators of asymmetric attacks multiply their effect by sending such "high-workload" requests to the target using many different TCP sessions from one or more requesting computing devices. Another type of application layer DoS attack is commonly referred to as an exploit attack or application-exploit attack, in which the perpetrator attempts to take advantage of a flaw or vulnerability in an application and thus degrade the target. Examples of application layer exploits include buffer overflow attacks, Structured Query Language (SQL) injection attacks (e.g., injecting a "shutdown" command to a SQL server, injecting a "benchmark" command to a MySQL server), Apache Range Header attacks, and Excessive Double Encoding attacks.

Victims of DoS attacks may suffer tremendous financial loss from the effects of negative publicity, losses of business and/or revenue, losses of productivity, and/or costs of repair or attack mitigation. As a result, many organizations have turned toward placing firewalls and/or intrusion protection systems (IPS) within their networks in an attempt to protect their resources against DoS attacks. However, these systems themselves are often the targets of DoS attacks, and further, such systems often cannot detect certain attacks that are not readily apparent within their network but are affecting the communication path(s) between their network and external users. Additionally, some types of DoS attacks—such as application layer DoS attacks—are particularly difficult to defend against using firewalls or IPS devices because many application layer DoS attacks are perpetrated using seemingly "legitimate" traffic that must be passed through to the target. Some organizations have also turned to the use of external mitigation services to protect against DoS attacks. However, while external mitigation solutions can mitigate some large-scale volumetric attacks, these solutions often cannot detect the existence of such attacks and further cannot protect against application layer attacks.

BRIEF DESCRIPTION OF THE DRAWINGS

The invention may best be understood by referring to the following description and accompanying drawings that are used to illustrate embodiments of the invention. In the drawings:

FIG. 6 is a diagram illustrating a flow for the detection and differentiation of DoS attacks according to certain embodiments of the invention.

DESCRIPTION OF EMBODIMENTS

In the following description, numerous specific details such as logic implementations, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

Bracketed text and blocks with dashed borders (e.g., large dashes, small dashes, dot-dash, and dots) are used herein to illustrate optional operations that add additional features to embodiments of the invention. However, such notation should not be taken to mean that these are the only options or optional operations, and/or that blocks with solid borders are not optional in certain embodiments of the invention.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The techniques shown in the figures can be implemented using code and data stored and executed on one or more electronic devices (e.g., an end station/computing device, a network device). Such electronic devices, which are also referred to as computing devices, store and communicate (internally and/or with other electronic devices over a network) code and data using computer-readable media, such as non-transitory computer-readable storage media (e.g., magnetic disks; optical disks; random access memory (RAM); read only memory (ROM); flash memory devices; phase-change memory) and transitory computer-readable communication media (e.g., electrical, optical, acoustical or other form of propagated signals, such as carrier waves, infrared signals, digital signals). In addition, such electronic devices include hardware, such as a set of one or more processors coupled to one or more other components, e.g., one or more non-transitory machine-readable storage media to store code and/or data, and a set of one or more wired or wireless network interfaces allowing the electronic device to transmit data to and receive data from other computing devices, typically across one or more networks (e.g., Local Area Networks (LANs), the Internet). The coupling of the set of processors and other components is typically through one or more interconnects within the electronic device, (e.g., busses and possibly bridges). Thus, the non-transitory machine-readable storage media of a given electronic device typically stores code (i.e., instructions) for execution on the set of one or more processors of that electronic device. Of course, one or more parts of an embodiment of the invention may be implemented using different combinations of software, firmware, and/or hardware.

As described herein, application layer DoS attacks typically operate at an "application layer" of a networking model. Two commonly used networking models include the Open Systems Interconnection (OSI) model (ISO/IEC 7498-1) and the "TCP/IP" model. The OSI model was developed to establish standardization for linking heterogeneous communication systems, and describes the flow of information from a software application of a first electronic device to a software application of a second electronic device through a communications network. The OSI model has seven functional layers including a physical layer (layer 1), a data link layer (layer 2), a network layer (layer 3), a transport layer (layer 4), a session layer (layer 5), a presentation layer (layer 6), and an application layer (layer 7). As used herein, when in the context of the OSI model, the "application layer" may refer to one or more of layers 5-7 (i.e., the session, presentation, and/or application layers). In the TCP/IP model, which defines a set of communications protocols commonly used in the Internet and many other networks, the application layer is an abstraction layer reserved for communications protocols and methods designed for process-to-process communications across an IP computer network. In the TCP/IP model, the application layer is defined as any protocol/method located above a transport layer, which is the layer that establishes process-to-process connectivity and includes, for example, TCP, UDP, and Stream Control Transmission Protocol (SCTP). The TCP/IP transport layer roughly corresponds to the transport layer (layer 4) of the OSI model. The application layer in the TCP/IP model (and as used herein when in the context of the TCP/IP model) includes higher-level protocols used by applications for providing user services over a network and for some basic network support services.

As described above, security devices (e.g., firewalls, IPS) need to be able to observe attack traffic in order to detect and/or mitigate attacks. Thus, these on-premise security devices might be able to detect some types of attacks where the attack traffic enters the network (e.g., some application layer DoS attacks), but will have no visibility into those attacks where the attack traffic is not observed by the devices. For example, an attack targeting a DNS server (that is located outside the network, but provides name translation services for an application hosted within the network) will not be observed by on-premise security devices, because the attack traffic typically does not enter the network. Similarly, certain infrastructure resource exhaustion attacks target devices (such as a load balancer or router) that are located upstream from both the application and on-premise security devices, and thus this attack traffic will also not be observed by the on-premise security devices.

In these attack scenarios where the attack traffic does not enter the local network, an off-premise device may be well situated (i.e., properly located) to detect and mitigate the attacks. However, off-premise devices lack the necessary tools (e.g., customer-generated rules) or data (e.g., SSL certificates for Transport Layer Security (TLS) decryption, application awareness, etc.) to be able to mitigate the attacks properly. For example, due to transport layer encryption (e.g., SSL, TLS), off-premise devices do not have visibility into the application layer information and can only examine transport layer information, and many enterprises are either unwilling or unable—due to regulatory or technical reasons, for example—to provide cryptographic keys to off-premise devices. Further, off-premise devices do not have insight into what constitutes acceptable or normal traffic for certain applications, and thus face tremendous difficulty in attempting to differentiate between normal network activity and abnormal network activity.

Further, some systems have been developed to "monitor" a network or application through the use of an off-premise device that periodically transmits probe messages to the network or application and waits for responses. Although these systems can detect an occurrence of some types of DoS attacks, they are unable to differentiate between different DoS attack types. For example, from the standpoint of an off-premise device, both volumetric DoS attacks and application layer DoS attacks will have a same observed effect— the responses to probe messages will not arrive or will arrive only after great delay. Moreover, such configurations also cannot detect certain types of DoS attacks. For example, a DNS redirection attack (also known as a DNS hijacking attack) that causes a fraudulent IP address to be returned for DNS queries made for a domain name of the application may not be detected by an off-premise device as a fraudulent server at the fraudulent IP address may similarly respond to the probe messages.

Embodiments of the invention provide methods, apparatuses, and systems to detect and distinguish DoS attacks. In some embodiments, both on-premise and off-premise capabilities are integrated to provide a comprehensive protection scheme against DoS attacks by leveraging the intelligent and granular detection capabilities of on-premise devices and the location benefit of off-premise devices.

Using embodiments of the invention, multiple types of DoS attacks may be detected and differentiated between to enable the implementation of effective attack mitigation techniques. In some embodiments, an off-premise device is configured to send test request messages toward an application within a protected network, and an on-premise device located within the network is configured to monitor these test request messages. In some embodiments, the on-premise device monitors its receipt (and/or non-receipt) of the test request messages and its receipt (and/or non-receipt) of test response messages sent by the application in response to the test request messages. Based upon determining which of the test request messages and test response messages are received or not received, the on-premise device is thus able to detect DoS attacks (including those DoS attacks happening "upstream" from the on-premise device and the protected application) and differentiate between different types of DoS attacks in order to enable the use of an effective mitigation technique.

Figure 1:
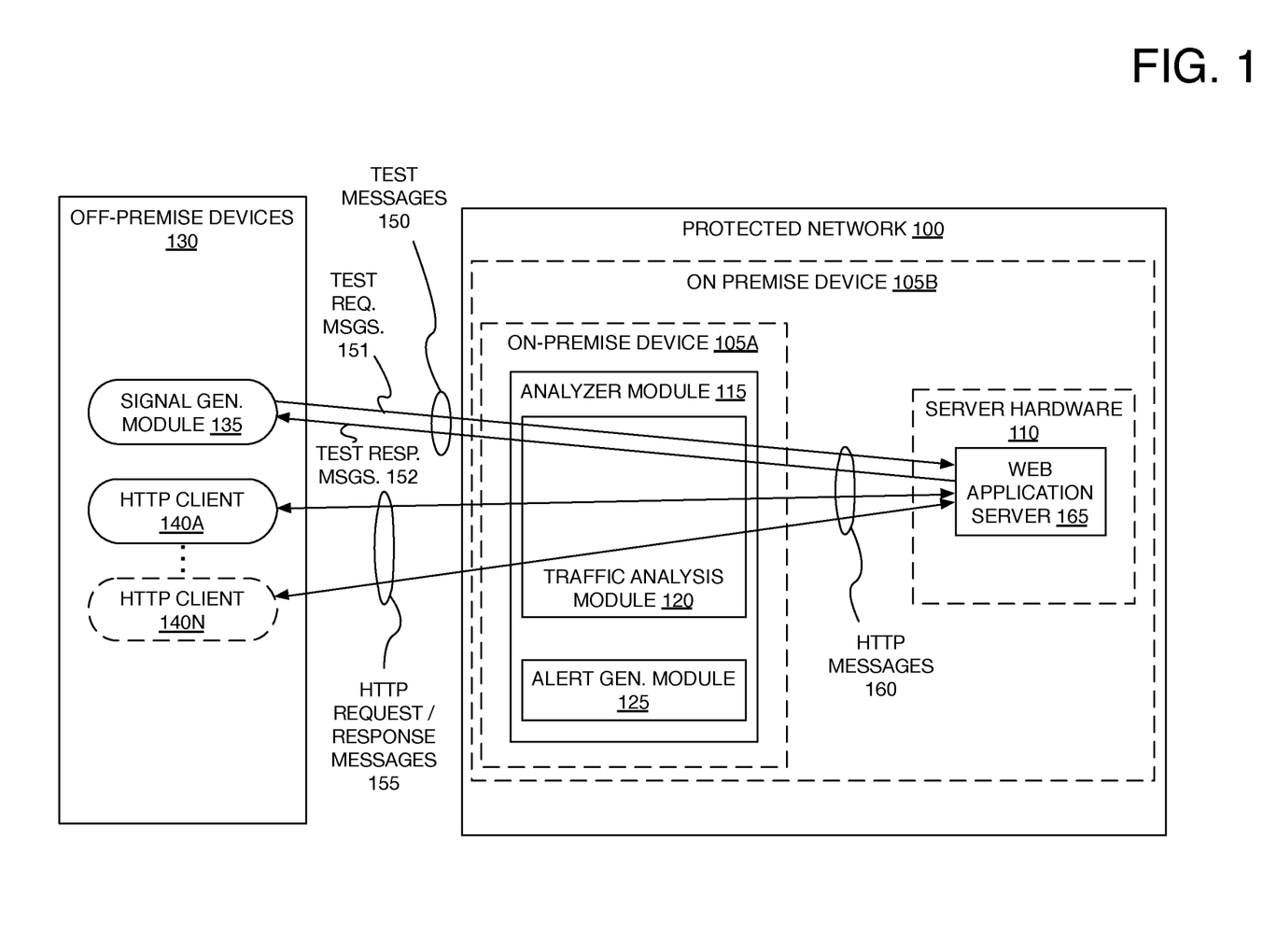
FIG. 1 is a block diagram illustrating a protected network including an on-premise device that includes an analyzer module for detecting and differentiating DoS attacks according to certain embodiments of the invention.

FIG. 1 is a block diagram illustrating a protected network 100 including an on-premise device 105 that includes an analyzer module 115 for detecting and differentiating DoS attacks according to certain embodiments of the invention. In this depiction, the on-premise device 105 may be on-premise device 105A, which is physically separate from the server hardware 110 executing a web application server 165, or alternatively it may be on-premise device 105B and thus provide the analyzer module 115 and the web application server 165 within a single device. FIG. 1 also illustrates a set of off-premise devices 130 that could be, depending upon the embodiment, one or multiple computing devices that provide a signal generation module 135 and one or more HTTP clients 140A-140N. In an embodiment, the signal generation module 135 is provided by a computing device and each of the HTTP clients 140A-140N is provided by a respective user device (i.e., user end station or user computing device). From the standpoint of the web application server 165, one or more of the HTTP clients 140A-140N may be authorized user HTTP clients interacting with the web application server 165 in a typical or anticipated manner, and one or more of the HTTP clients 140A-140N may be attacker HTTP clients that attempt to interact with the web application server 165 in an unanticipated, unauthorized, and/or malicious manner.

In some embodiments, the on-premise device 105 is a network device. As used herein, a network device (e.g., a router, switch, bridge) is an electronic device that is a piece of networking equipment, including hardware and software, which communicatively interconnects other equipment on the network (e.g., other network devices, end stations). Some network devices are "multiple services network devices" that provide support for multiple networking functions (e.g., routing, bridging, switching), and/or provide support for multiple application services (e.g., data, voice, and video). Client end stations (e.g., workstations, laptops, netbooks, palm tops, mobile phones, smartphones, multimedia phones, Voice Over Internet Protocol (VoIP) phones, user equipment (UE), terminals, portable media players, GPS units, gaming systems, set-top boxes) are computing devices that may execute applications (e.g., an HTTP client 140A such as a web browser, operating system software) to access content and/or services provided over a LAN, over the Internet, and/or over virtual private networks (VPNs) overlaid on (e.g., tunneled through) the Internet. The content and/or services are typically provided by one or more computing devices (e.g., server end stations comprising server hardware 110) running a web application server 165 and belonging to a service or content provider, and may include, for example, public web pages (e.g., free content, store fronts, search services), private web pages (e.g., username/password accessed web pages providing email services), and/or data provided or stored using Application Programming Interface (API) calls.

A web application server 165 is system software (running on top of an operating system) executed by server hardware 110 upon which web applications run. Web application servers 165 may include a web server (e.g. Apache, Microsoft® Internet Information Server (IIS), nginx, lighttpd), which delivers web pages upon the request of HTTP clients 140A-140N (i.e., software executing on end stations) using HTTP, and may also include an application server that executes procedures (i.e., programs, routines, scripts) of a web application. Web application servers 165 typically include web server connectors, computer programming language libraries, runtime libraries, database connectors, and/or the administration code needed to deploy, configure, manage, and connect these components. Web applications are computer software applications made up of one or more files including computer code that run on top of web application servers 165 and are written in a language the web application server 165 supports. Web applications are typically designed to interact with HTTP clients 140A-140N by dynamically generating HTML responsive to HTTP request messages 155 sent by those HTTP clients 140A-140N.

HTTP clients 140A-140N are often executed on client end stations (i.e., one or more of off-premise devices 130) that are located outside of the protected network 100 including the on-premise device 105A and the web application server 165, and that are being utilized by users (i.e., persons, including end users of a service and/or administrative users) to access the content and/or services provided by the web application server 165. Although not typical sources of DoS attack traffic, one or more of the HTTP clients 140A-140N may also be executed on client end stations located within the same protected network 100 as the on-premise device 105A and the web application server 165.

HTTP clients 140A-140N interact with web applications by transmitting HTTP request messages 155 to web application servers 165, which execute portions of web applications and return web application data in the form of HTTP response messages 155 back to the HTTP clients 140A-140N, where the web application data may be processed using a web browser. Thus, HTTP functions as a request-response protocol in a client-server computing model, where the web application server 165 typically acts as the "server" and the HTTP clients 140A-140N typically act as the "client."

HTTP Resources are identified and located on a network by Uniform Resource Identifiers (URIs)—or, more specifically, Uniform Resource Locators (URLs)—using the HTTP or HTTP Secure (HTTPS) URI schemes. URLs are specific strings of characters that identify a particular reference available using the Internet. URLs typically contain a protocol identifier or scheme name (e.g. http/https/ftp, a colon, two slashes, and one or more of user credentials, server name, domain name, Internet Protocol (IP) address, port, resource path, query string, and fragment identifier, which may be separated by periods and/or slashes.

In some embodiments, the on-premise device 105 is a computing device such as a commercial off-the-shelf (COTS) computing device (e.g., an x86-based server end station). The on-premise device 105 may also be a security gateway. Security gateways, such as firewalls and web application firewalls (WAFs), are network security systems that protect software applications (e.g., web application server 165) executing on electronic devices (e.g., server hardware 110) within a network 100 by controlling the flow of network traffic passing through the security gateway. By analyzing packets flowing through the security gateway and determining whether those packets should be allowed to continue traveling through the network, the security gateway can prevent malicious traffic from reaching a protected application. Security gateways may be implemented using a dedicated computing device (e.g., as a dedicated COTS server computing device executing a security gateway module), a shared computing device (e.g., as a virtual machine executing on a COTS server computing device that executes multiple virtual machines), or as another type of electronic device and can be software, hardware, or a combination of both. As one example, a security gateway including the analyzer module 115 may execute as (or on) a first virtual machine on an on-premise device 105B, and the web application server 165 may execute as (or on) another virtual machine on the same on-premise device 105B.

In the depicted embodiment of FIG. 1, the signal generation module 135 is configured to send test request messages 151 to the web application server 165. In some embodiments, the test request messages 151 comprise HTTP request messages, but in other embodiments, the test request messages 151 may include ICMP messages (e.g., ICMP echo request packets), Simple Network Management Protocol (SNMP) messages, TCP messages, handshake messages, or nearly any other type of application layer protocol message. In this depicted embodiment, the web application server 165 may receive and transmit HTTP messages 160 to and from the signal generation module 135 and one or more HTTP clients 140A-140N.

The analyzer module 115, in some embodiments, receives the test request messages 151 transmitted by the signal generation module 135 before the web application server 165. The analyzer module 115 may be provided by an on-premise device 105A located inline between the signal generation module 135 and the server hardware 110 executing the web application server 165, or as described above, may execute as part of a virtual machine on a same computing device that executes the web application server 165. In other embodiments, the analyzer module 115 may not be inline and/or may simply sniff network traffic and thus may receive test request messages 151 either before or after the web application server 165. In some embodiments, the analyzer module 115 receives test request messages 151 sent from the web application server 165 to signal generation module 135 before the signal generation module 135 receives those messages as the web application server 165 and the analyzer module 115 are located within a same network 100 and thus likely connected by fewer network "hops"—however, this is not a necessary feature and simply describes the most common case.

In the depicted embodiment, the analyzer module 115 includes a traffic analysis module 120 and an alert generation module 125. The traffic analysis module 120 is configured to be aware of a time schedule indicating when the signal generation module 135 is configured to transmit test request messages 151, as well as what types of test request messages 151 are to be transmitted by the signal generation module 135. Upon receipt of a test request message 151 from the signal generation module 135, the traffic analysis module 120 determines and records the type of the test request message 151 and a time value (e.g., a timestamp, a clock value) that the test request message 151 was received. Similarly, upon receipt of a test response message 152 from the web application server 165 (e.g., an HTTP response message sent responsive to a test request message 151 comprising an HTTP request message), the traffic analysis module 120 may determine and record a time that the test response message 152 was received, and associates this time with the previously recorded information for the test request message 151 sent by the signal generation module 135 (e.g., an HTTP request message) that prompted this test response message 152 (e.g., an HTTP response message). Using one or more of the schedule and the timing information for the test messages 150, the traffic analysis module 120 is thus able to detect occurrences of DoS attacks and differentiate between different DoS attack types using the methods and processes described herein. Upon detecting an attack, the alert generation module 125 of the analyzer module 115 is configured to generate an alert that indicates the existence of the detected DoS attack and/or identifies the particular type of the DoS attack. The alert, in various embodiments, comprises displaying a message to a user via a user interface display; transmitting an electronic mail (e-mail) message, short message service (SMS) message, or other electronic message to an account or device of a user or administrator of the network 100 or another network; and/or sending a signal to another computing device—internal and/or external to the network 100—to cause that computing device (e.g., a firewall, load balancer, security device) to implement measures (e.g., traffic blocking) to mitigate the attack, subject traffic of the attack to further scrutiny, and/or transmit additional messages to other computing devices to attempt to mitigate the attack.

Figure 2:
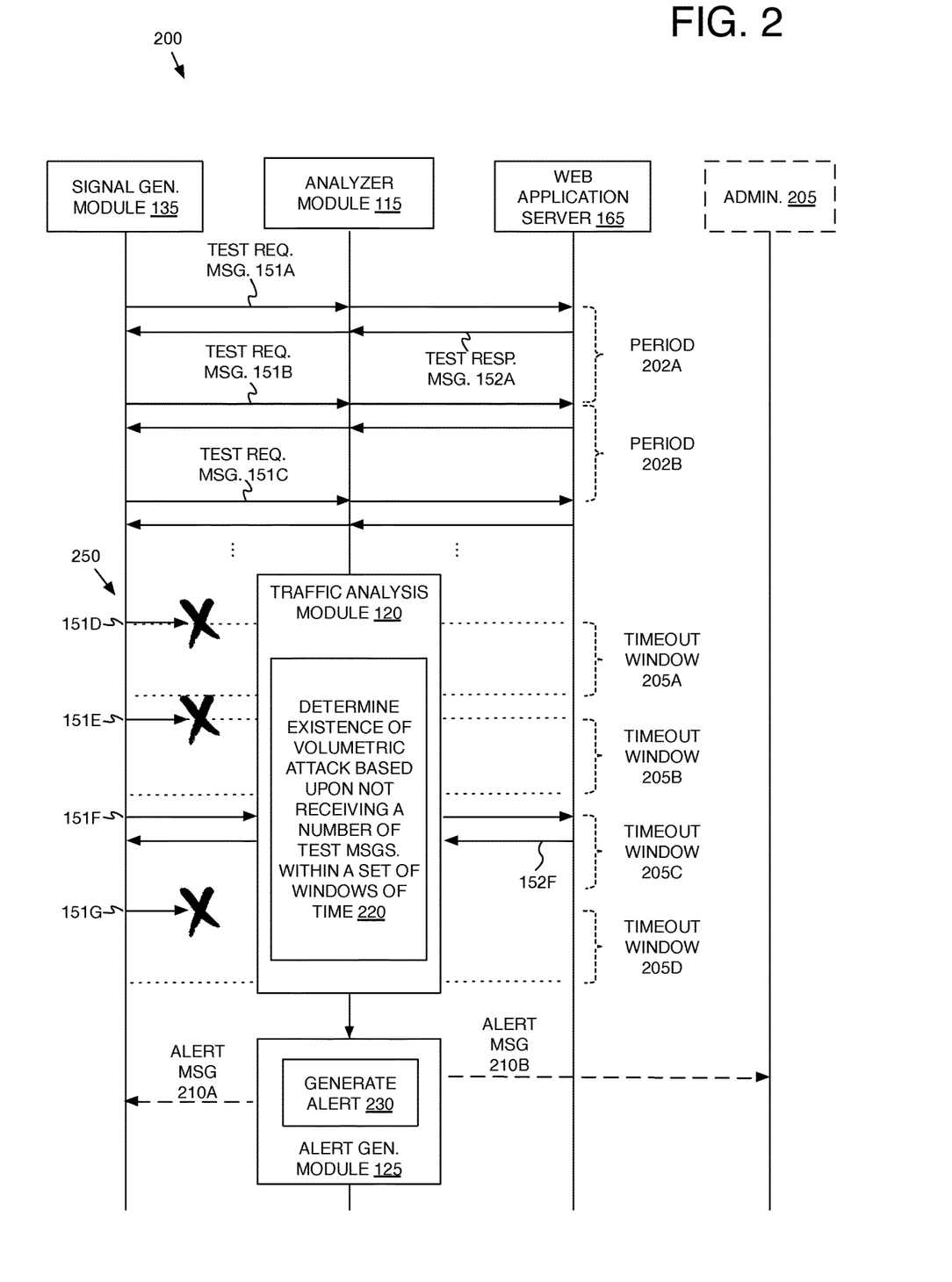
FIG. 2 is a combined sequence and flow diagram illustrating a detection and differentiation of volumetric DoS attacks according to certain embodiments of the invention.
Figure 3:
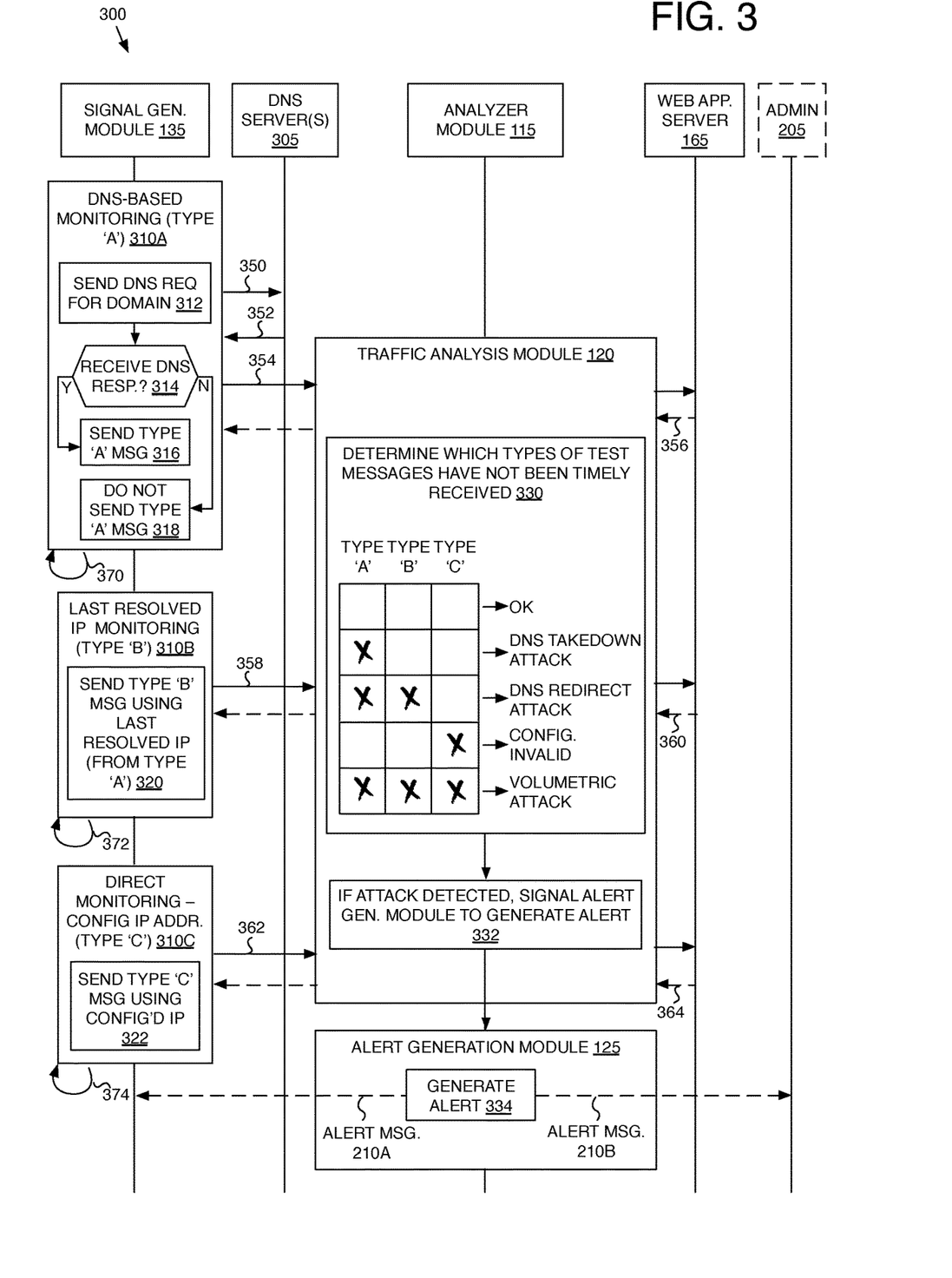
FIG. 3 is a combined sequence and flow diagram illustrating a detection of and differentiation between volumetric DoS attacks, DNS takedown attacks, and DNS redirection attacks according to certain embodiments of the invention.
Figure 4:
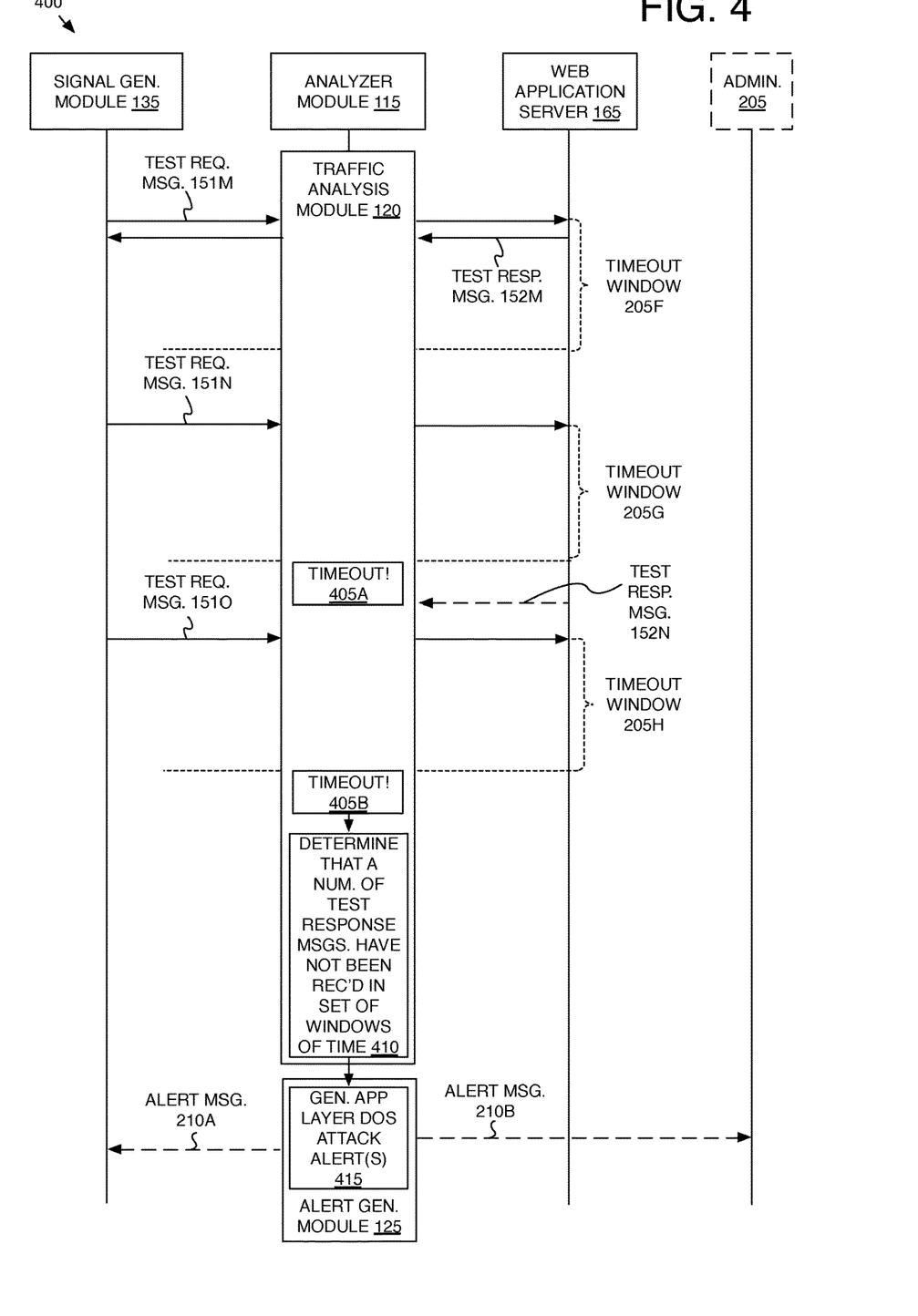
FIG. 4 is a combined sequence and flow diagram illustrating a detection and differentiation of application layer DoS attacks according to certain embodiments of the invention.

FIG. 2, FIG. 3, and FIG. 4 each depict operations of a signal generation module 135 and an analyzer module 115. In embodiments of the invention, the signal generation module 135 is provided by an off-premise device 130 that is outside a protected network 100 including an on-premise device 105A providing the analyzer module 115. FIG. 2 is a combined sequence and flow diagram 200 illustrating a detection and differentiation of volumetric DoS attacks according to certain embodiments of the invention.

As depicted in FIG. 2, the signal generation module 135 is configured to transmit test request messages 151 to the web application server 165 according to a schedule. In some embodiments, the schedule indicates that the messages be sent periodically. For example, each test request message 151 may be sent every minute, five minutes, fifteen minutes, or any other number (or fraction) of seconds, minutes, hours, etc. In some embodiments, the schedule indicates that the test request messages 151 are to be transmitted using irregular intervals. For example, in an embodiment the test request messages 151 are transmitted at time intervals that are based upon a numerical result of a transform function (e.g., a cryptographic function) such that both the signal generation module 135 and the analyzer module 115 are able to jointly and independently determine the next numerical result and thus, the next time interval. In some embodiments, the transform function uses (or at least, initially uses) a shared secret (e.g., a shared key, a shared set of values used in the transform function). In some embodiments, the transform function uses values from one or more previously transmitted and/or received test messages 150. For example, in an embodiment the transform function is based upon an application of a hash function to a portion of data that was encrypted when sent in a previous test message 150. Of course, many other possibilities for independently calculating a same value may be used and are known to those of ordinary skill in the art. Although FIG. 2 depicts one type of test request message 151 being transmitted from the signal generation module 135, in some embodiments multiple types of test request messages 151 are sent by the signal generation module 135, and some or all of the types may utilize different schedules that may be periodic or irregular.

As indicated earlier, the type of the test message 150 may be different based upon preference or based upon the type of application being monitored within the network 100. In FIG. 2, for example, the application is a web application executing via web application server 165, and thus the test messages 150 may comprise HTTP messages (e.g., HTTP request messages, HTTP response messages). Of course, in other embodiments, the test messages 150 may be other types of well-known messages, and possibly comprise messages that do not solicit (or require) a response from the recipient.

The sequence and flow diagram 200 begins with the signal generation module 135 transmitting a first test request message 151A toward the web application server 165. This transmission begins a signaling session, such that the signal generation module 135 uses the configured schedule to determine when to send future test request messages 151B-151G. In the depicted embodiment of FIG. 2, the schedule (not illustrated) indicates that the test request messages 151A-151G are to be transmitted according to a regular period (e.g., periods 202A-202B). In an embodiment, upon sending the first test request message 151A, a process of the signal generation module 135 registers a timeout with a wakeup equal to the period 202A and enters sleep mode, so that when the period 202A of time expires, the process is awoken to again transmit another test request message (e.g., test request message 151B). The test request message 151A is received by the analyzer module 115, which records a receipt time of the test request message 151A. In some embodiments, the analyzer module 115 then re-transmits the test request message 151A to the web application server 165, but in some embodiments the test request message 151A is already en route to the web application server 165 or has even arrived at the web application server 165 without any action on the part of the analyzer module 115.

The contents of the test messages 150 may vary depending upon the embodiment. In some embodiments, each test message (e.g., test request message 151A) is a valid request for the web application—for example, a test request message 151A may comprise an HTTP GET request for a particular web page that is part of the web application. This validity of the test request message ensures that if no problems and/or attacks are occurring, the protected application (e.g., the web application executed by the web application server 165) processes the test request message 151A to thereby allow the analyzer module 115 to determine the health of the link(s) between it and the web application server 165 and/or the load upon the web application server 165. In some embodiments, the test request messages 151A-151G are non-destructive (i.e., do not cause the web application server 165 to change its state by modifying, deleting, or adding information based upon receipt of the test request messages 151) such that the transmission of the test request messages 151 does not create any external effect to the web application aside from requiring it to process the test request messages 151 and possibly transmit test response messages 152 in response.

In some embodiments of the invention, each test request message 151 includes a value that is different from one test request message (e.g., 151A) to the next test request message (e.g., 151B). This ensures that the test request messages 151 will, in fact, actually reach the protected application (e.g., web application server 165) and will not be answered by a cache (e.g., a web cache, forward cache, client cache, content delivery network (CDN) cache) before reaching the protected application, as each test request message 151 will not have been seen before by a cache. For example, the differing value may be a value in a query string field-value pair, or the differing value may be a different portion of a URL (e.g., a request for "/signal/100.asp", a next request for "/signal/101.asp", etc., where the "signal" folder may exist or be a virtual folder, and where the asp pages may or may not exist). In an embodiment, this value is a counter that increments from one message to the next, but in other embodiments this value is a timestamp, which may be generated by the signal generation module 135 or taken from other network traffic received by the signal generation module 135. In some embodiments, the value is a random or pseudorandom number generated by the signal generation module 135.

Further, in some embodiments each of the test request messages 151 is "signed" to enable the analyzer module 115 to determine that the test request messages 151 were actually transmitted by the signal generation module 135. In some embodiments, the test request messages 151 are signed using cryptographic keyed-hash message authentication codes (HMAC) or other well-known cryptographic protocols known to those of skill in the art for providing for authentication. In some embodiments, if the signature of a test request message 151 is incorrect, the analyzer module 115 will purposefully fail to transmit the test request message 151 on to the web application server 165, and in some embodiments issues an alert to an administrator 205 to indicate that a possible attack upon or tampering with the detection and differentiation system has been detected.

Turning back to FIG. 2, as the web application server 165 receives the test request message 151A, it processes the message 151A and transmits a test response message 152A back toward the signal generation module 135. In an embodiment, this processing of the test request message 151A does not cause any state change within the web application. Upon receipt of the test response message 152A, the analyzer module 115 records a timestamp representing a time the analyzer module 115 received the test response message 152A. In an embodiment, this timing information is correlated with the recorded timing information of the initial test request message 151A, and may be used to generate a profile of response time information describing how long the web application server 165 typically takes to generate such response messages (e.g., test response message 152A). In some embodiments, the analyzer module 115 re-transmits the test response message 152A toward the signal generation module 135.

At the conclusion of the schedule-defined period 202A, this procedure repeats and signal generation module 135 transmits another test request message 151B toward the web application server 165 and waits another period 202B before sending an additional test request message 151C.

At indicator 250, a volumetric DoS attack begins against the web application server 165 and/or protected network 100 and may operate against computing devices in a communication path between the Internet and the web application server 165. For example, the volumetric DoS attack may impact a service provider's network equipment (i.e., one or more computing devices) outside the protected network 100 or network equipment within the protected network 100 (e.g., a gateway or firewall at the border of the protected network 100, another switch or router, etc.). The occurrence of the volumetric DoS attack impacts a test request message 151D transmitted by the signal generation module such that the analyzer module 115 does not observe the test request message 151D (and similarly is not received by the web application server 165). In an embodiment, based upon the schedule (which is known by both the signal generation module 135 and the analyzer module 115), the analyzer module 115 has configured a timeout window 205A indicating a range of time in which it expects test request message 151D to arrive. The size of the timeout window 205A is up to configuration, but in some embodiments it should be a large enough amount of time to allow for the test messages 150 to arrive under normally occurring, minor network delays, but small enough to detect atypical network delays. Of course, the definition of "typical" and "atypical" network delay is highly subjective and left to the configuration of the particular implementation, as different systems include different equipment, workloads, network links, geographic locations, geographic user bases, delay tolerances, etc.

In the depicted embodiment of FIG. 2, the traffic analysis module 120 of the analyzer module 115 is configured to determine that a volumetric DoS attack is occurring based upon not receiving a number of test request messages 151 within a set of windows of time (also referred to herein as "timeout windows"). In some embodiments with highly-regular network delays, the traffic analysis module 120 may be configured to cause the alert generation module 125 to generate an alert 230 after just one test request message (e.g., 151D) is not received within its one timeout window 205A. In the depicted embodiment, the traffic analysis module 120 is configured to determine the existence of the volumetric DoS attack when three or more test request messages (151D, 151E, 151G) have not been received within their respective timeout windows (205A, 205B, 205D) over the last four timeout windows (205A-205D). For example, in FIG. 2 test request message 151D is not received within its timeout window 205A, test request message 151E is not received in its timeout window 205B, but test request message 151F is received within its timeout window 205C (and test response message 152F is also received). Had test request message 151F instead not been received, the traffic analysis module 120 would have caused the alert generation module 125 to generate the alert 230 because the previous three test messages would not have been received (out of the last four, assuming the test request message prior to message 151D was, in fact, received within its window). However, because test request message 151F was received, upon the traffic analysis module 120 failing to receive test request message 151G within its timeout window 205D, the traffic analysis module 120 will determine that three of the last four expected test request messages 151 were not received, and thus cause the alert generation module 125 to generate the alert 230.

In the depicted embodiment, the alert 230 generation may include either transmitting an alert message 210A to the signal generation module 135 (which may in turn cause the signal generation module to perform an action to attempt to mitigate the attack), and/or transmitting an alert message 210B to an administrator 205 of the protected network 100 to inform the administrator 205 of the DoS attack and that the attack type of the DoS attack is a volumetric DoS attack. As described above, other alerts may be generated, including but not limited to displaying a message using a user interface display, transmitting an e-mail or SMS message, and/or sending a signal to another computing device to cause that computing device to implement measures to mitigate the attack or subject traffic of the attack to further scrutiny. In certain embodiments, one or more of the alert messages 210A-210B are sent out-of-band such that they are not impacted by any volumetric DoS attack, and in some embodiments they are sent using a connectionless protocol (e.g., UDP) instead of a connection-oriented protocol (TCP) to avoid the need to initiate new connections (e.g., perform handshaking) and/or perform connection acknowledgements in the middle of a volumetric DoS attack, which might disrupt such actions from occurring.

Although FIG. 2 depicts the detection and differentiation of a volumetric DoS attack, the use of test messages 150 and other concepts depicted in FIG. 2 may be combined with other concepts to enable further detection and differentiation of DoS attacks. FIG. 3 is a combined sequence and flow diagram 300 illustrating a detection of and differentiation between volumetric DoS attacks, DNS takedown attacks, and DNS redirection attacks according to certain embodiments of the invention. In FIG. 3, the signal generation module 135 is configured to transmit three different "types" of test request messages 151. In various embodiments, the content (or portions of content) for each type of test request message may be the same or different and the schedules may similarly be the same or different. However, in the depicted embodiment of FIG. 3, the types of test request messages differ based upon what conditions exist in order for each type of message to be transmitted. In some of these embodiments, each test request message 151 also includes an identifier (e.g., a set of one or more bits representing a type identifier) that identifies which "type" of test request message it is.

In FIG. 3, three different types of test request messages 151 (and corresponding monitoring processes) are represented, but in other embodiments more or fewer types of test request messages 151 and/or monitoring processes may be utilized at any time. A first type of test request message—referred to as type "A" messages—are transmitted as part of DNS-based monitoring 310A. In the depicted embodiment of FIG. 3, a second type of test request message—referred to as type "B" messages—are transmitted as part of "last resolved IP" monitoring 310B. Additionally, a third type of test request message—referred to as type "C" messages—are transmitted as part of "direct" monitoring 310C.

In DNS-based monitoring 310A, each type "A" test message 354 is transmitted 316 toward the web application server 165 only after an IP address of the web application server 165 has been received through a DNS resolution process. For example, DNS-based monitoring 310A includes sending 312 a DNS query request 350 to a DNS server 305 for a domain name used by the web application server 165. In an embodiment, the DNS server 305 is located outside the protected network 100, but in some embodiments the DNS server 305 is located within the protected network 100. In some embodiments, the DNS server 305 is a primary or secondary authoritative DNS server for the web application server 165, but in other embodiments the DNS server 305 is a recursive DNS server. If a DNS response 352 to the DNS query 350 is successfully received 314 by the signal generation module 135, then a type "A" test message 354 is transmitted 316 toward the web application server 165 using the resolved IP address returned by the DNS server 305 in the DNS response message 352. However, if the signal generation module 135 does not receive 314 a DNS response 352 (within a timeout window, for example), the DNS-based monitoring 310A will not send 318 a type "A" test message (e.g., 352). In an embodiment, this procedure will repeat one or more times according to a schedule as indicated by arrow 370.

In "last resolved IP" monitoring 310B, each type "B" test message 358 is transmitted 320 toward the web application server 165 using the last-resolved IP address obtained from the DNS-based monitoring 310A. For example, in an embodiment, the IP address returned in the last received DNS response message 352 is used as the destination IP address of the test message 358. Thus, in such an embodiment, if the DNS-based monitoring 310A receives a first DNS response message 352 but then fails to receive subsequent DNS response messages during later iterations 370, the "last resolved IP" monitoring 310B will utilize the IP address from the first DNS response message 352 while the DNS-based monitoring 310A will not send any test request messages during the failed iterations. This process will also repeat one or more times according to a schedule, as indicated by arrow 372.

In "direct monitoring" 310C, each type "C" test message 362 is transmitted 322 toward the web application server 165 using a configured IP address of the web application server 165. For example, upon configuring the signal generation module 135 to perform the processes described herein for a particular protected application (e.g., web application server 165), an administrator (or automated process) will configure the signal generation module 135 with a known IP address of the protected application. This configured IP address is not updated through DNS-based monitoring 310A, but instead is updated by an administrator again entering an updated IP address, for example. This process will also repeat one or more times according to a schedule, as indicated by arrow 374.

In an embodiment, the traffic analysis module 120 will generate and store timestamps indicating a time of receipt of the test request messages (354, 358, 362), and will similarly generate and store timestamps associated with its time of receipt of test response messages (356, 360, 364) sent in response. In some embodiments, the traffic analysis module 120 is configured to use this timing information for DoS attack differentiation to identify application layer DoS attacks, which will be detailed further herein with respect to FIG. 4 and FIG. 5.

In the depicted embodiment of FIG. 3, however, the traffic analysis module 120 is configured to determine 330 which types of test messages 150 have not been timely received. This determination 330 may occur periodically (e.g., at regular intervals, according to a schedule) or in response to an event (e.g., after a test message is not received within its time window). In various embodiments, a type of test messages is deemed as timely received when a percentage of recent test messages have been received within their respective scheduled windows of time. For example, in an embodiment a type of test messages is deemed timely received when at least nine of the last ten test messages of that type were received within their respective time windows; however, varying definitions may be used, which may include only looking at the most recent test message of that type and whether or not it was received within its window of time. For the purpose of this discussion within the context of FIG. 3, if a type of test message satisfies the definition of being timely received, that type of the test messages is deemed "valid" and is represented by an empty entry in FIG. 3; if the test messages do not satisfy the definition of being timely received, that type of the test messages is deemed "invalid" and is represented by an "X" in FIG. 3.

In the depicted embodiment of FIG. 3, the determination 330 proceeds as follows.

- If all three types of test messages are valid, the traffic analysis module 120 determines 330 that no DoS attack is likely occurring and that everything is "OK" 330A.
- If the type "A" test messages are invalid, but both type "B" and type "C" test messages are valid, a DoS attack is determined to exist and the differentiated type of the attack is determined to be a DNS takedown attack 330B. A DNS takedown attack is an attack made against a DNS server (e.g., DNS server 305) in an effort to make it inoperative, and may include any type of DoS attack.
- If the type "A" messages and the type "B" test messages are both invalid, but the type "C" test messages are still valid, a DoS attack is determined to exist and the differentiated type of the attack is determined to be a DNS redirection attack 330C. A DNS redirection attack, which is also referred to as a DNS hijacking attack, is the practice of subverting the resolution of DNS query such that an improper IP address (e.g., any IP address that is not the true IP address) of the protected application is returned for a DNS query made to resolve the IP address for a domain of the application. Various methods are used to implement DNS redirection attacks that are known to those of ordinary skill in the art.

If the type "A" and type "B" test messages are both valid, but the type "C" test messages are invalid, then an invalid configuration is determined to exist 330D. In an embodiment, the traffic analysis module 120 is able to determine that an administrator (or automated process) improperly configured the signal generation module 135 (or has failed to configure the signal generation module 135) with an IP address of the protected application.

If each of the three types of test messages (types A, B, and C) are invalid, then a DoS attack is determined to exist and the differentiated type of the attack is determined to be a volumetric attack 330E.

If other, non-illustrated combinations of test message types occur, the results are deemed inconclusive. In some embodiments, the traffic analysis module 120 will wait until a next determination 330 point, though in some embodiments the traffic analysis module 120 will signal 332 the alert generation module 125 to generate 334 an alert to indicate the anomaly.

Thus, in an embodiment when an attack is detected, the traffic analysis module 120 will signal 332 the alert generation module 125 to generate an alert 334, which may include sending an alert message 210A to the signal generation module 135 or an alert message 210B to an administrator.

Though FIG. 3 depicts the use of three different types of test request messages 151 and monitoring (310A-310C) types, in some embodiments fewer types of test messages and monitoring are used. For example, in an embodiment only direct monitoring 310C occurs, which allows for the differentiation between application layer attacks and other types of attacks. In an embodiment, both direct monitoring 310C and DNS-based monitoring 310A is used, which allows for differentiation between application layer attacks, DNS type attacks, and volumetric attacks. Of course, other combinations of types of test messages may be used as well.

FIG. 4 is a combined sequence and flow diagram 400 illustrating a detection and differentiation of application layer DoS attacks according to certain embodiments of the invention. FIG. 4 includes multiple test request messages 151M-151O that are sent by the signal generation module 135. These multiple test request messages 151M-151O may all be part of a particular type of test message (e.g., type "A", "B", or "C" as described with respect to FIG. 3) or some or all may be different types of test request messages 151.

In this depicted embodiment, the signal generation module 135 transmits a first test request message 151M toward the web application server 165 that is received by the traffic analysis module 120. The traffic analysis module 120 determines a timeout window 205F that a test response message (e.g., test response message 152M) is expected to be received within. In an embodiment this determined timeout window 205F is set by configuration, and in an embodiment it is based upon previous, historic performance of the web application server 165 in responding to test or HTTP request messages (or just test request messages 151 of the same type as test request message 151M). In this example, the web application server 165 processes the test request message 151M and transmits a test response message 152M within the timeout window 205F.

However, when the signal generation module transmits a second test request message 151N, the web application server 165 fails to respond within the timeout window 205G—instead, it sends a test response message 152N too late. In this embodiment, the traffic analysis module 120 generates a timeout 405A indicating that the test response message 152N was not received in time. Similarly, the web application server 165 also fails to respond to a third test request message 151O within its respective timeout window 205H, and thus the traffic analysis module 120 generates another timeout 405B.

In an embodiment, the traffic analysis module 120 determines 410 that a number of test response messages 152 have not been received in a set of windows of time. In an embodiment, the determining 410 comprises checking whether a first threshold number of timeouts have occurred within a second threshold number of recent timeout windows. For example, in the depicted embodiment of FIG. 4 the determining 410 comprises determining whether at least two timeouts (405A, 405B) have occurred within the last three timeout windows 205F-205H, which is true. In response, the traffic analysis module 120 causes the alert generation module 125 to generate an alert message (e.g., 210A, 210B) indicating that an application layer DoS attack may be occurring.

Figure 5:
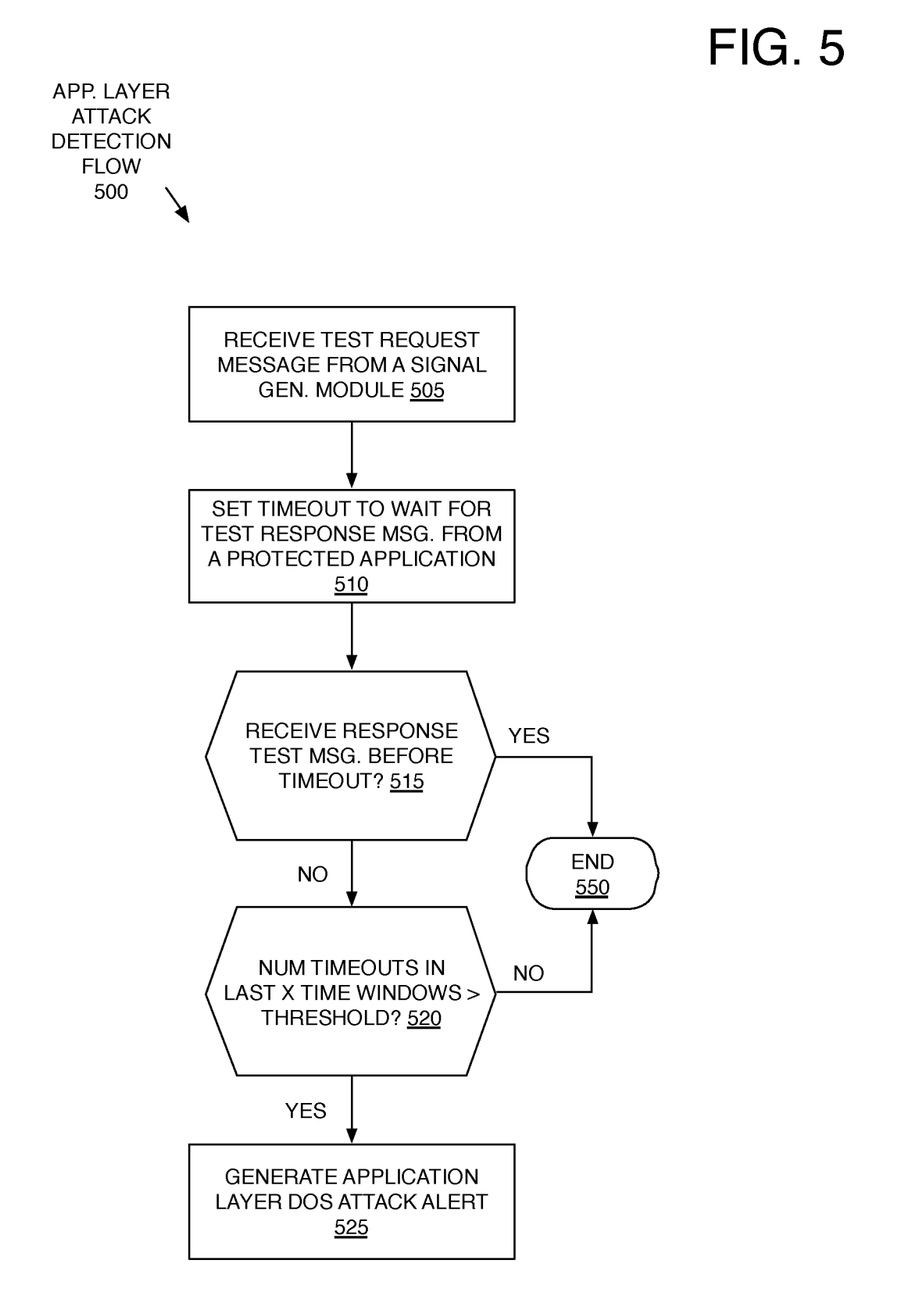
FIG. 5 is a diagram illustrating a flow for the detection and differentiation of application layer DoS attacks according to certain embodiments of the invention.

FIG. 5 is a diagram illustrating a flow 500 for the detection and differentiation of application layer DoS attacks according to certain embodiments of the invention. In an embodiment, the flow 500 is performed in an analyzer module 115 of an on-premise computing device located within a same protected network 100 as a protected application.

The flow includes, at block 505, receiving a test request message from a signal generation module 135. In an embodiment, the signal generation module 135 is located outside the protected network 100. At block 510, the flow 500 includes setting a timeout to wait for a test response message from the protected application. Upon an expiration of the timeout window, the flow 500 includes determining 515 whether a test response message has been received. If so, the flow 500 ends. However, if no test response message has been received at the end of the timeout window then a "timeout" is deemed to have occurred, and the flow 500 continues with block 520, where it is determined whether at least a threshold number of timeouts have occurred within a certain number of time windows. If not, the flow 500 ends. However, if that threshold number of timeouts has occurred, the flow 500 continues with generating an alert to indicate that an application layer DoS attack might be occurring.

FIG. 6 is a diagram illustrating a flow 600 for the detection and differentiation of DoS attacks according to certain embodiments of the invention. In an embodiment, the flow is performed in an analyzer module 115 of an on-premise computing device located within a same protected network 100 as a web application server.

The flow 600 includes, at block 605, tracking whether test HTTP messages are timely received. The test HTTP messages include test HTTP request messages that a signal generation module is configured to transmit to the web application server according to a schedule. The signal generation module is executing on a device that is off-premise and outside the protected network.

The test HTTP messages also include test HTTP response messages that the web application server is expected to transmit to the signal generation module in response to the test HTTP request messages. Both the test HTTP request messages and the test HTTP response messages are for the purpose of allowing the analyzer module to detect and distinguish between the plurality of types of DoS attacks. The analyzer module is aware of a timeliness with which the signal generation module is expected to transmit the test HTTP request messages to the web application server and with which the web application server is expected to transmit the test response HTTP messages to the signal generation module in response to the test request HTTP messages.

In an embodiment, the test HTTP request messages include 610 a first plurality of messages to be transmitted using a configured IP address of the web application server.

In an embodiment, the test HTTP request messages include 615 a second plurality of messages that are only to be transmitted after a successful resolution, for each message, of an IP address of the web application server via a DNS query.

In an embodiment, the test HTTP request messages include 620 a third plurality of messages to be transmitted using the most recent successfully resolved IP address attained by the DNS queries 620.

At block 625, the flow 600 includes detecting the occurrence of a DoS attack and identifying the type of the DoS attack based upon the result of the tracking indicating that a number of the test HTTP messages have not been timely received by the analyzer module. In various embodiments, the type of the DoS attack can be differentiated between one or more of the DoS attack types including application layer DoS attacks 630, DNS takedown attacks 635, DNS redirection attacks 640, and volumetric attacks 645.

After detecting the occurrence of the DoS attack and identifying the type of the DoS attack, the analyzer module 115 is configured, in some embodiments of the invention, to generate an alert indicating the existence of the DoS attack and optionally identifying the identified type of the DoS attack.

Alternative Embodiments

The operations in the flow diagrams have been described with reference to the exemplary embodiments of the other diagrams. However, it should be understood that the operations of the flow diagrams can be performed by embodiments of the invention other than those discussed with reference to these other diagrams, and the embodiments of the invention discussed with reference these other diagrams can perform operations different than those discussed with reference to the flow diagrams.

For example, some embodiments of the invention may utilize a plurality of signal generation modules 135 to reduce the likelihood that one signal generation module 135 may be affected by a failure and thereby reduce the efficacy of the described systems and procedures. Thus, in some embodiments the analyzer module 115 is configured to receive and analyze one or more types of test request messages 151 sent from multiple signal generation modules, which may be located in different geographic locations and act independently. For example, the analyzer module 115 may be configured to receive three types of test request messages from a first signal generation module, one type of test request messages from a second signal generation module, and three types of test request messages from a third signal generation module. In such embodiments, the analyzer module 115 may make DoS detection and differentiation determinations based upon test request messages from more than one (but not necessarily all) of the signal generation modules. For example, if test messages are not received from a particular signal generation module for a period of time—perhaps due to a hardware or network failure not associated with any DoS attack—the analyzer module 115 may determine that messages from one or more other signal generation modules are still arriving successfully, and thereby not improperly determine the existence of an attack.

Similarly, while the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method in an analyzer module to detect and distinguish between a plurality of types of Denial-of-Service (DoS) attacks, wherein the analyzer module is within a same protected network and on-premise with a server executing on server hardware, wherein the server is to receive request messages transmitted from devices that are off-premise and outside of the protected network, wherein the analyzer module is coupled to receive these request messages, the method comprising:
    tracking, by the analyzer module, whether test messages are timely received by the analyzer module, wherein the test messages comprise test request messages that one or more signal generation modules are configured to transmit to the server according to a predefined time schedule to allow the analyzer module to detect and distinguish between the plurality of types of DoS attacks, wherein the one or more signal generation modules are executing on one or more devices that are off-premise and outside the protected network, wherein the analyzer module is aware of the predefined time schedule according to which the one or more signal generation modules are configured to transmit the test request messages to the server; and
    detecting the occurrence of a DoS attack and identifying the type of the DoS attack based upon the result of the tracking indicating that a number of test messages have not been timely received by the analyzer module, wherein the type of the DoS attack is identified based upon which types of test messages were timely received or not timely received.

2. The method of claim 1, wherein the test messages further comprise test response messages that the server is expected to transmit to the respective ones of the one or more signal generation modules in response to the test request messages, and wherein the analyzer module is further aware of a timeliness with which the server is expected to transmit the test response messages to respective ones of the one or more signal generation modules in response to the test request messages.

3. The method of claim 2, wherein the test messages are application layer messages, and wherein the plurality of types of DoS attacks that the analyzer module is able to differentiate between includes:
    application layer attacks against the server; and
    infrastructure attacks that affect a communication path to the server.

4. The method of claim 1, wherein the analyzer module is configured to expect to receive at least two types of test request messages from at least one of the one or more signal generation modules.

5. The method of claim 1, wherein the analyzer module is configured to expect to receive at least two types of test request messages from each of the one or more signal generation modules.

6. The method of claim 1, wherein the one or more signal generation modules comprise a plurality of signal generation modules.

7. The method of claim 6, wherein the detecting includes ruling out a likelihood that one of the plurality of signal generation modules, from which the test request messages have not been timely received during a period of time, may be affected by a hardware or network failure not associated with any DoS attack based on the non-timely receipt of the test request messages from one or more other signal generation modules of the plurality of signal generation modules.

8. The method of claim 7, wherein the one of the plurality of signal generation modules from which the test request messages have not been timely received is located in a different geographic region than the one or more other signal generation modules.

9. The method of claim 6, wherein the detecting is based upon determining that the result of the tracking indicates that those of the test request messages expected during a period of time have not been timely received from multiple of the plurality of signal generation modules.

10. The method of claim 6, wherein the detecting is based upon determining that the result of the tracking indicates that those of the test request messages expected during a period of time have not been timely received from multiple of the plurality of signal generation modules that are located in a same geographic region.

11. The method of claim 6, wherein the detecting is based upon determining that the result of the tracking indicates that those of the test request messages expected during a period of time have not been timely received from multiple of the plurality of signal generation modules that are located in different geographic regions.

12. A non-transitory computer-readable storage medium storing instructions that can be executed by a processor of a device to implement an analyzer module to detect and distinguish between a plurality of types of Denial-of-Service (DoS) attacks, wherein the analyzer module is to be within a same protected network and on-premise with a server, wherein the server is to receive request messages transmitted from devices that are off-premise and outside of the protected network, wherein the analyzer module is to be coupled to receive these request messages, wherein the instructions cause the analyzer module to perform operations comprising:

tracking whether test messages are timely received by the analyzer module, wherein the test messages comprise test request messages that one or more signal generation modules are configured to transmit to the server according to a predefined time schedule to allow the analyzer module to detect and distinguish between the plurality of types of DoS attacks, wherein the one or more signal generation modules are executing on one or more devices that are off-premise and outside the protected network, wherein the analyzer module is aware of the predefined time schedule according to which the one or more signal generation modules are configured to transmit the test request messages to the server; and detecting the occurrence of a DoS attack and identifying the type of the DoS attack based upon the result of the tracking indicating that a number of test messages have not been timely received by the analyzer module, wherein the type of the DoS attack is identified based upon which types of test messages were timely received or not timely received.

13. The non-transitory computer-readable storage medium of claim 12, wherein the test messages further comprise test response messages that the server is expected to transmit to the respective ones of the one or more signal generation modules in response to the test request messages, and wherein the analyzer module is further aware of a timeliness with which the server is expected to transmit the test response messages to respective ones of the one or more signal generation modules in response to the test request messages.

14. The non-transitory computer-readable storage medium of claim 13, wherein the test messages are application layer messages, and wherein the plurality of types of DoS attacks that the analyzer module is able to differentiate between includes:

application layer attacks against the server; and
infrastructure attacks that affect a communication path to the server.

15. The non-transitory computer-readable storage medium of claim 12, wherein the analyzer module is configured to expect to receive at least two types of test request messages from at least one of the one or more signal generation modules.

16. The non-transitory computer-readable storage medium of claim 12, wherein the analyzer module is configured to expect to receive at least two types of test request messages from each signal generation module of the one or more signal generation modules.

17. The non-transitory computer-readable storage medium of claim 12, wherein the one or more signal generation modules comprise a plurality of signal generation modules.

18. The non-transitory computer-readable storage medium of claim 17, wherein the detecting includes ruling out a likelihood that one of the plurality of signal generation modules, from which the test request messages have not been timely received during a period of time, may be affected by a hardware or network failure not associated with any DoS attack based on the non-timely receipt of the test request messages from one or more other signal generation modules of the plurality of signal generation modules.

19. The non-transitory computer-readable storage medium of claim 18, wherein the one of the plurality of signal generation modules from which the test request messages have not been timely received is located in a different geographic region than the one or more other signal generation modules.

20. The non-transitory computer-readable storage medium of claim 17, wherein the detecting is based upon determining that the result of the tracking indicates that those of the test request messages expected during a period of time have not been timely received from multiple of the plurality of signal generation modules.

* * * * *